(12) United States Patent
Yu et al.

(10) Patent No.: US 8,467,131 B2
(45) Date of Patent: Jun. 18, 2013

(54) MULTILAYER OPTICAL FILM LAYER COMPRISING BLEND OF METHYL METHACRYLATE POLYMER AND STYRENE ACRYLONITRILE POLYMER

(75) Inventors: Ta-Hua Yu, Woodbury, MN (US); Timothy J. Hebrink, Scandia, MN (US); Yufeng Liu, Woodbury, MN (US); Edward J. Kivel, Stillwater, MN (US); Daniel M. Czuprynski, Hudson, WI (US); James A. Klein, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/003,312

(22) PCT Filed: Jul. 1, 2009

(86) PCT No.: PCT/US2009/049344
§ 371 (c)(1),
(2), (4) Date: Jan. 10, 2011

(87) PCT Pub. No.: WO2010/008933
PCT Pub. Date: Jan. 21, 2010

(65) Prior Publication Data
US 2011/0109966 A1 May 12, 2011

Related U.S. Application Data

(60) Provisional application No. 61/081,137, filed on Jul. 16, 2008.

(51) Int. Cl.
*G02B 5/30* (2006.01)
*B32B 7/02* (2006.01)
*B32B 27/08* (2006.01)

(52) U.S. Cl.
USPC ............... 359/489.11; 359/489.15; 428/212; 428/515; 428/522

(58) Field of Classification Search
USPC ............... 359/489.11, 489.15; 428/212, 515, 428/522
See application file for complete search history.

(56) References Cited

U.S. PATENT DOCUMENTS

| | | | | |
|---|---|---|---|---|
| 3,610,729 A | * | 10/1971 | Rogers | 359/485.03 |
| 4,083,896 A | | 4/1978 | Moran et al. | |
| 4,310,584 A | * | 1/1982 | Cooper et al. | 428/212 |
| 5,103,337 A | * | 4/1992 | Schrenk et al. | 359/359 |
| 5,122,905 A | * | 6/1992 | Wheatley et al. | 359/586 |
| 5,122,906 A | * | 6/1992 | Wheatley | 359/586 |
| 5,126,880 A | * | 6/1992 | Wheatley et al. | 359/587 |
| 5,218,051 A | * | 6/1993 | Maurer et al. | 525/221 |
| 5,262,894 A | * | 11/1993 | Wheatley et al. | 359/586 |
| 5,278,694 A | * | 1/1994 | Wheatley et al. | 359/359 |

(Continued)

FOREIGN PATENT DOCUMENTS
EP 1932879 6/2008
WO WO 2008/144656 11/2008

OTHER PUBLICATIONS

Ramaswamy et al._Low-Loss Polymer Films with Adjustable Refractive Index; Jul. 1973; vol. 12 No. 7, Applied Optics, pp. 1581-1583.

(Continued)

*Primary Examiner* — Ricky D Shafer
(74) *Attorney, Agent, or Firm* — Carolyn A. Fischer (57) ABSTRACT

Presently described are multilayer optical films comprising an optical stack comprising at least one first birefringent optical layer; at least one (e.g. isotropic) second optical layer having a birefringence of less than 0.04 at 633 nm, and optionally at least one skin layer. The second layer, skin layer, or a combination thereof comprises a blend of at least one methyl methacrylate polymer and at least one styrene-acrylonitrile polymer.

17 Claims, 1 Drawing Sheet

U.S. PATENT DOCUMENTS

| | | | |
|---|---|---|---|
| 5,486,949 | A * | 1/1996 | Schrenk et al. .......... 359/489.12 |
| 5,612,820 | A | 3/1997 | Schrenk et al. |
| 5,677,050 | A | 10/1997 | Bilkadi et al. |
| 5,882,774 | A | 3/1999 | Jonza et al. |
| 6,096,375 | A | 8/2000 | Ouderkirk et al. |
| 6,368,699 | B1 | 4/2002 | Gilbert et al. |
| 6,459,514 | B2 | 10/2002 | Gilbert et al. |
| 6,673,425 | B1 * | 1/2004 | Hebrink et al. ................ 428/212 |
| 6,783,349 | B2 | 8/2004 | Neavin et al. |
| 6,827,886 | B2 | 12/2004 | Neavin et al. |
| 2001/0046086 | A1 | 11/2001 | Wheatley et al. |
| 2005/0161840 | A1 | 7/2005 | Stover et al. |
| 2006/0226562 | A1 | 10/2006 | Johnson et al. |
| 2009/0273836 | A1 | 11/2009 | Yust et al. |

OTHER PUBLICATIONS

Fowler et al. _Effect of Copolymer Composition on the Miscibility of Blends of Styrene-Acrylonitrile Copolymers with Poly(meth methacrylate); Polymer, Jun. 1987, vol. 28; pp. 1177-1184.

Naito et al._Compatibility in Blends of Poly(methyl methacrylate) and Poly(styrene-co-acrylonitrile). Physical Properties. vol. 11, No. 6, Nov.-Dec. 1978, pp. 1260-1265.

Stein et al. _ Phanomenologische Untersuchungen zur Mischbarkeit von Polymeren; Die Angewandte Makromolekulare Chemie 36 (1974) 89-100 (Nr. 520).

Bernstein et al. _ LCST Behavior in Polymer Blends; Macromolecules, vol. 10, No. 3, May-Jun. 1977; pp. 681-686.

International Search Report PCT/US2009/049344 Oct. 2, 2009, 4 pgs.

U.S. Appl. No. 09/006,288, filed Jan. 13, 1998.

Boese et al., J. Polym. Sci.: Part B, 30:1321-1327 (1992) Chain Orientation and Anisotropies in Optical and Dielectric Properties in Thin Films of Stiff Polyimides.

Zang et. al., Appl. Phys. Letters, 59:823-825 (1991) Giant anisotropies in the dielectric properties of quasi-epitaxial crystalline organic semiconductor thin films.

* cited by examiner

MULTILAYER OPTICAL FILM LAYER COMPRISING BLEND OF METHYL METHACRYLATE POLYMER AND STYRENE ACRYLONITRILE POLYMER

This application is a national stage application filed under 35 USC 371 of PCT/US2009/049344 filed Jul. 1, 2009 and claims priority to U.S. Provisional Application Ser. No. 61/081137, filed Jul. 16, 2008.

BACKGROUND

Multilayer polymeric optical films are widely used for various purposes, including as mirrors and polarizers. Multilayer optical films can be prepared by multiple alternating layers such as a first birefringent polymeric material layer alternated with a second isotropic polymeric material layer. Alternatively, the first and second polymeric materials may both be orientated provided that there is a sufficient difference in refractive index mismatch between the first and second layers.

As described for example in U.S. Pat. No. 5,612,820, copolymers and blends may be used to provide an extremely wide variety of different refractive indicies which may be matched or provide optimum polarizing effect. Additionally, the use of copolymers and miscible blends of polymers may be used to enhance the processability of the alternating layer during coextrusion and orientation. Further, the use of copolymers and miscible blends permits the adjustment of the stress optical coefficients and glass transition temperatures.

SUMMARY

Presently described are multilayer optical films comprising an optical stack comprising at least one first birefringent optical layer; at least one (e.g. isotropic) second optical layer having a birefringence of less than 0.04 at 633 nm, and optionally at least one skin layer. The second layer, skin layer, or a combination thereof comprises a blend of at least one methyl methacrylate polymer and at least one styrene-acrylonitrile polymer.

In one embodiment, the components of the blend are selected such that the multilayer film has a haze of no greater than 5%.

In another embodiment, the styrene-acrylonitrile polymer of the blend comprises an acrylonitrile concentration of greater than 10 wt-% and less than 28 wt-%.

In yet another embodiment, the multilayer film has an acrylonitrile concentration ranging from about 0.5 wt-% to about 12.5 wt-%.

In each of these embodiments, the blend typically comprises at least 10 wt-% of styrene-acrylonitrile polymer and at least 10 wt-% of methyl methacrylate polymer. For embodiments wherein the second layer comprises a blend of at least one methyl methacrylate polymer and at least one styrene-acrylonitrile polymer, the average refractive index of the blend preferably ranges from 1.50 to 1.55. In some embodiments, the multilayer optical film is a mirror film or a polarizing film. The polarizing film can exhibit an average transmission for p-polarized light ranging from 10% to 90%. In some embodiments, the first birefringent layer preferably comprises polyalkylene naphthalates, polyalkylene terephthalates, and blends thereof. In other embodiments, the first birefringent layer comprises syndiotactic polystyrene.

DETAILED DESCRIPTION

The present invention relates to multilayer optical films comprising an isotropic layer comprising certain blends of methyl methacrylate polymer (PMMA) and styrene acrylonitrile (SAN) polymer.

Figure 1:
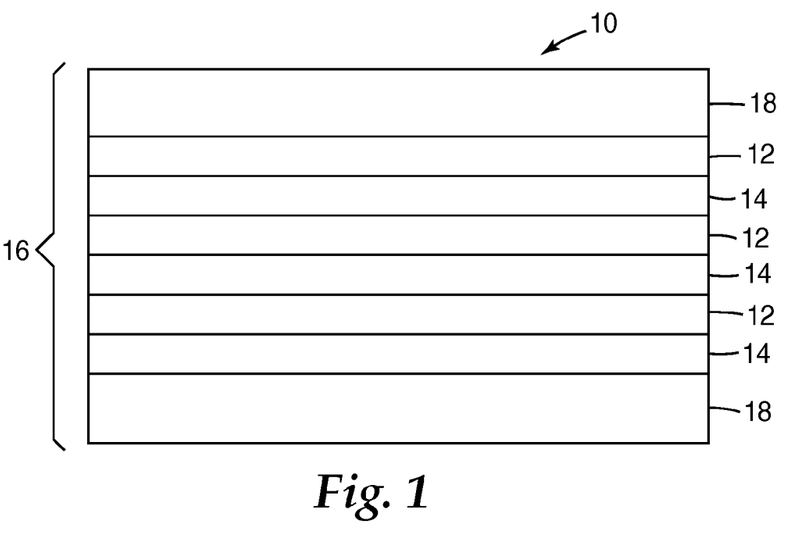
FIG. 1 is a cross sectional view of one embodiment of a multilayer optical film.

Multilayer films include a film having two or more layers. Multilayer optical films are useful, for example, as highly efficient mirrors and/or polarizers. Multilayer optical films as used in conjunction with the present disclosure exhibit relatively low absorption of incident light, as well as high reflectivity for off-axis as well as normal light rays. As used in this application:

"index of refraction" refers to a refractive index of a material in the plane of the material with respect to light at 633 nm and normal incidence, unless otherwise indicated;

"birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). Birefringence values are reported with respect to light at 633 nm and normal incidence, unless otherwise indicated; "high refractive index" and "low refractive index" are relative terms; when two layers are compared in at least one direction of interest, the layer that has a greater in-plane refractive index is the high refractive index layer, and the layer that has a lower in-plane refractive index is the low refractive index layer;

"polymer" means, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise;

FIG. 1 shows a multilayer polymer film 10 which may be used, for example, as an optical polarizer or mirror. The film 10 includes one or more first optical layers 12, one or more second optical layers 14, and optionally one or more (e.g. non-optical) layers such as skin layers 18. FIG. 1 includes a multilayer stack having alternating layers 12, 14 of at least two materials. In one embodiment, the materials of layers 12 and 14 are polymeric. In general, U.S. Pat. No. 6,827,886, entitled "Method for making multilayer optical films," describes methods that can be adapted for making multilayer film 10. In addition, although film 10 and layers 12, 14 are illustrated as having planar surfaces, at least one surface of the film 10 or layers 12, 14 or an additional layer may be structured.

An in-plane index of refraction n1 of high refractive index layer 12 is higher than an in-plane index of refraction n2 of low refractive index layer 14. The difference in refractive index at each boundary between layers 12, 14 causes part of the light rays to be reflected. The transmission and reflection characteristics of multilayer film 10 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms reflecting surface. The reflective power of interface surface depends on the square of the difference between the effective indices of refraction of the layers 12, 14 (e.g., $(n1-n2)^2$). By increasing the difference in the indices of refraction between the layers 12, 14, improved optical power (higher reflectivity), thinner films (thinner or fewer layers), and broader bandwidth performance can be achieved. Multilayer film 10 can thus be made useful as a reflective polarizer or mirror, for example. The refractive index difference in an exemplary embodiment is at least about 0.05, preferably greater than about 0.10, more preferably greater than about 0.20 and even more preferably greater than about 0.30.

In one embodiment, the materials of layers 12, 14 inherently have differing indices of refraction. In another embodiment, at least one of the materials of layers 12, 14 has the property of stress induced birefringence, such that the index of refraction (n) of the material is affected by the stretching process. By stretching multilayer film 10 over a range of uniaxial to biaxial orientations, films can be created with a range of reflectivities for differently oriented plane-polarized incident light.

In exemplary embodiments, multilayer film 10 includes tens, hundreds or thousands of layers, and each layer can be made from any of a number of different materials. The characteristics which determine the choice of materials for a particular stack depend upon the desired optical performance of multilayer film 10. Multilayer film 10 can contain as many materials as there are layers in the stack. However, for ease of illustration, exemplary embodiments of optical thin film stacks show only a few different materials.

In one embodiment, the number of layers in multilayer film 10 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 500.

In some embodiments, the multilayer polymer film further comprises optional additional non-optical or optical layers. The additional layers can be polymer layers that are disposed within the stack. Such additional layers may protect the optical layers 12, 14 from damage, aid in the co-extrusion processing, and/or to enhance post-processing mechanical properties. The skin layers 18 are often thicker than the optical layers 12, 14. The thickness of the additional skin layers 18 is usually at least two times, preferably at least four times, and more preferably at least ten times, the thickness of the individual optical layers 12, 14. The thickness of the skin layers 18 may be varied to make a multilayer polymer film 10 having a particular thickness. Typically, one or more of the skin layers 18 are placed so that at least a portion of the light to be transmitted, polarized, and/or reflected by the optical layers 12, 14, also travels through the skin layers (i.e., the skin layers are placed in the path of light which travels through or is reflected by the optical layers 12, 14).

One embodiment of multilayer film 10 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low-high index pairs of layers may have different combined optical thicknesses, such as where a broadband reflective optical film is desired.

In those applications where reflective films (e.g. mirrors or polarizers) are desired, the desired average transmission for light of each polarization and plane of incidence generally depends upon the intended use of the reflective film. One way to produce a multilayer mirror film is to biaxially stretch a multilayer stack. For a high efficiency reflective film, average transmission along each stretch direction at normal incidence over the visible spectrum (about 380-750 nm) is desirably less than about 10 percent (reflectance greater than about 90 percent), preferably less than about 5 percent (reflectance greater than about 95 percent), more preferably less than about 2 percent (reflectance greater than about 98 percent), and even more preferably less than about 1 percent (reflectance greater than about 99 percent). The average transmission at about 60 degrees from the normal over the visible spectrum is desirably less than about 20 percent (reflectance greater than about 80 percent), preferably less than about 10 percent (reflectance greater than about 90 percent), more preferably less than about 5 percent (reflectance greater than about 95 percent), and even more preferably less than about 2 percent (reflectance greater than about 98 percent), and even more preferably less than about 1 percent (reflectance greater than about 99 percent). Some examples of mirror films are further described in U.S. Pat. No. 5,882,774 (Jonza et al.).

In addition, asymmetric reflective films (such as films resulting from unbalanced biaxial stretching) may be desirable for certain applications. In that case, average transmission along one stretch direction may be desirably less than, for example, about 80 percent, while the average transmission along the other stretch direction may be desirably less than, for example, about 10 percent, over a bandwidth of, for example, the visible spectrum (about 380-750 nm), or over the visible spectrum and into the near infrared (e.g., about 380-850 nm).

In one embodiment, the asymmetric reflective film can exhibit an average on-axis reflectivity of at least 90% for visible light polarized in a first plane, and an average on-axis reflectivity of at least 25% but less than 90% for visible light polarized in a second plane perpendicular to the first plane. (See PCT/US2008/064133, filed May 19, 2008)

Multilayer optical films can be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, nx, ny and nz, the desired polarizer behavior can be obtained. See, for example U.S. Pat. No. 5,882,774 (Jonza et al.).

The high refractive index layers 12 are prepared from birefringent polymeric material(s) having an in-plane birefringence (the absolute value of nx-ny) after orientation of 0.05 or greater at 633 nm. Preferably the in-plane birefringence is about 0.10, 0.15, 0.20 or greater. The refractive index for 633 nm light polarized in a plane parallel to the stretch direction can increase from about 1.62 to as high as about 1.87. Within the visible spectrum, birefringent copolyester material exhibits a birefringence of 0.20 to 0.40 over a wavelength range of 400-700 nm for a typical high orientation stretch (e.g., a material stretched to five or more times its original dimension at a temperature of 100 to 150° C. and an initial strain rate of 5 to 150%/sec).

For other types of multilayer optical films, such as those utilized as a mirror film, the out-of-plane birefringence properties are of importance. Out-of-plane birefringence concerns the difference between average of in-plane indices (MD and TD) and the index normal to the film (TM). Out-of-plane birefringence can be expressed as following:

$$\Delta n_{out} = \frac{(n_x + n_y)}{2} - n_z$$

wherein $n_x$ is RI in MD and $n_y$ is RI in TD and $n_z$ is RI in TM.

The birefringent polymeric material can exhibit an average out-of-plane birefringence of at least 0.10. In some embodiments, the average out-of-plane birefringence is at least 0.16, 0.17, or 0.18 or at least 0.20.

The second optical layers 14 retain a relatively isotropic index of refraction, even when stretched. The second optical layers have a birefringence of less than about 0.04, and more preferably less than about 0.02 at 633 nm.

The second isotropic optical layer(s) and/or the skin layer(s) comprise certain blends of poly(methyl methacrylate) (PMMA) and styrene acrylonitrile (SAN) polymer.

The methylmethacrylate polymer can be poly(methyl methacrylate) homopolymer, or a copolymer of methylmethacrylate with a comonomer. The comonomer is typically ethyl methacrylate, propyl methacrylate, butyl methacrylate, amyl methacrylate, hexyl methacrylate, acrylonitrile, acrylic acid, ethyl acrylate, butyl acrylate or mixtures thereof. The methyl methacrylate polymers typically comprise at least about 90 percent by weight of methyl methacrylate. Such methyl methacrylate polymers typically have a Tg of at least 100° C.

The PMMA polymer is made by free-radical polymerization, and generally comprises 50-70% syndiotactic, approximately 20-40% (e.g. approximately 30%) atactic, and less than 10% isotactic dyads. Commercial grades have good mechanical properties, outstanding scratch resistance, and extremely good weatherability. In addition, PMMA is optically clear with 92% transmission through the visible wavelength range. Further PMMA exhibits very little absorption below 260 nm and extremely low intrinsic birefringence (<0.006). This combinations of low absorption, low intrinsic birefringence, good dimensional stability, and good weatherability distinguishes PMMA from other low refractive index thermoplastic polymers for optical film applications.

Examples of commercially available methyl methacrylate homopolymers and copolymers include those available from Arkema Inc. under the trade designations "Plexiglas® V044", "Plexiglas® V920", "Plexiglas® CP82", and "Plexiglas® HT121"; from Mitsuibishi Rayon America Inc., under the trade designation ShinkoLite-P; from Plaskolite-Continental Acylics under the trade designation "Optix®"; from Evonik Degussa Corporation under the trade designations "Acrylite® H15" and "Acrylite® HW55"; and from LG Chem Ltd. under the trade designation "LG PMMA EF940".

The styrene acrylonitrile (SAN) polymer is a copolymer of a styrenic monomer and an ethylenically unsaturated nitrile monomer(s). Suitable styrenic monomers include for example alphaalkyl monovinylidene monoaromatic compounds, e.g., alpha-methylstyrene, alpha-ethylstyrene, alpha-methylvinyl toluene, alpha-methyl dialkylstyrenes, etc.; ring-substituted alkyl styrenes, e.g., vinyl toluene, o-ethylstyrene, p-ethylstyrene, 2,4-dimethylstyrene, etc.; and mixtures thereof. For embodiments, wherein the styrenic monomer include alkyl substituents, the alkyl substituents generally have 1 to 4 carbon atoms. Suitable ethylenically include acrylonitrile, methacrylonitrile, ethacrylonitrile and mixtures thereof.

Styrene and acrylonitrile, in a ratio from 90/10 to 60/40, can be copolymerized under emulsion, bulk, or solution conditions using free-radical initiators. The copolymers are rigid and transparent. The styrene portion provides clarity, stiffness, and process-ability, while the acrylonitrile portion provides chemical and heat resistance. This unique combination of excellent optical properties, heat resistance, high tensile and flexural strengths, good heat performance, ease of fabrication, and low cost make styrene acrylonitrile copolymers ideal for various applications. In addition, the refractive index of styrene and acrylonitrile is roughly 1.589 and 1.512 respectively, which in turn results in an effective refractive index of their copolymers from 1.56-1.58 depending on the composition of the copolymer. For multilayer optical films, it is an advantage to be able to attain a wide range of refractive indicies, e.g. from 1.495-1.558, with a single resin in order that the optical properties of the multilayer optical films can be adjusted together with the high index resin(s).

However, only SAN polymers have an acrylonitrile concentration of greater than 10 wt-% and less than 28 wt-% have been found to be sufficiently miscible with PMMA to provide an isotropic optical layer having sufficiently low haze to be suitable for use in a multilayer optical film.

In some embodiments, the concentration of acrylonitrile of the SAN polymer(s) is at least 11 wt-%, 12 wt-%, 13 wt-%, 14 wt-% or 15 wt-%. Further, the concentration of the acrylonitrile of the SAN polymer(s) can be no greater than 24 wt-%, 25 wt-% or 26 wt-%.

Examples of commercially available styrene acrylonitrile copolymers include those from Lanxess Corporation under the trade designation "Lustran Sparkle" (17 wt-% acrylonitrile "AN"); from Dow Chemicals under the trade designation "Tyril 990" (20 wt-% AN, from Samsung under the trade designation "Starex HF5661HC" (23.8 wt-% AN), and from BASF under the trade designation "Luran® 358N".

Figure 2:
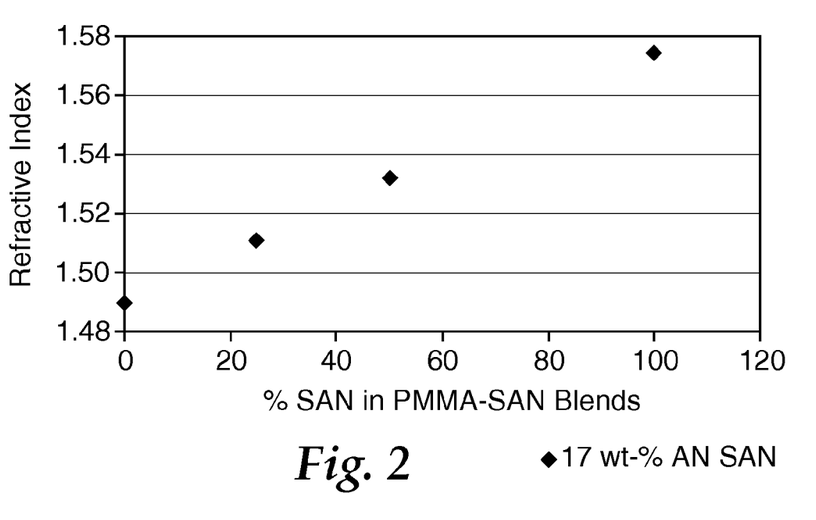
FIG. 2 depicts the refractive index of films made from blends of methyl methacrylate polymer and styrene acrylonitrile polymer having 17 wt-% acrylonitrile.

Provided that the SAN polymer has the concentration of acrylonitrile as just described, the SAN polymer can be combined with PMMA at any concentrations in order to adjust or "tune" the refractive index of the isotropic layer relative to the birefringent layer. The isotropic layer typically comprises at least 5 wt-% or 10 wt-% of the SAN polymer and in some embodiments at least 15, 20, or 25 wt-%. FIG. 2 illustrates the refractive index of various embodiments of blends of SAN and PMMA.

Depending on the concentration of SAN relative to PMMA in the isotropic layer and the concentration of acrylonitrile in the SAN polymer, the concentration of acrylonitrile in the optical stack (i.e. the combination of first birefringent optical layer(s) and second isotropic layer(s) can vary as depicted in the following Table.

| Concentration of Acrylonitrile in Optical Stack | | | |
|---|---|---|---|
| Concentration of SAN in Isotropic Layer | 10 wt-% | 50 wt-% | 90 wt-% |
| Concentration of AN in Isotropic layer for SAN comprising 10-28 wt-% AN | 1-2.8 wt-% | 5-14 wt-% | 9-25.2 wt-% |

-continued

Concentration of Acrylonitrile in Optical Stack

| Concentration of AN in Optical Stack (assuming isotropic layer is about half the total) | 0.5-1.4 wt-% | 2.5-7 wt-% | 4.5-12.1 wt-% |
|---|---|---|---|

Hence, when the isotropic layer comprises about 20 wt-% to about 80 wt-% of SAN, the optical stack generally comprises about 1 to about 13 wt-% of acrylonitrile. In preferred embodiments, the concentration of SAN is typically no greater than about 60 wt-% and thus the concentration of acrylonitrile in the optical stack is generally less than 10 wt-%.

The haze of (i.e. a 5-6 mil monolithic) films prepared from the blends of PMMA and SAN described herein exhibit a haze of less than 10%, preferably less than 5% and more preferably less than 2 or 1% as measured according to the test method described in the forthcoming examples.

Some exemplary materials for high refractive index layer 12 are crystalline, semi-crystalline, amorphous or liquid crystalline materials, including polymers. Although crystallinity may aid in preserving the birefringence of oriented films, an oriented amorphous polymer film will remain birefringent if the glass transition temperature of the film is sufficiently higher than its maximum use temperature, for example. Specific examples of suitable materials for high refractive index layer 12 include polyalkylene naphthalates (e.g., PEN(polyethylene naphthalate), PPN(polypropylene naphthalate), PBN(polybutylene naphthalate), and PCN(poly-1,4-cyclohexanedimethylenenaphthalate), PHN(polyhexamethylenenaphthalate)) and isomers thereof (e.g., 2,6-, 1,4-, 1,5-, 2,7-, and 2,3-PEN), polyalkylene terephthalates (e.g., PET (polyethylene terephthalate), PPT(polypropylene terephthalate), PBT(polybutylene terephthalate), and PCT(poly-1,4-cyclohexanedimethylene terephthalate), PHT (polyhexamethyleneterephthalate)), polyimides (e.g., polyacrylic imides), polyetherimides, atactic polystyrene, polycarbonates, syndiotactic polystyrene (sPS) including those prepared from poly-alpha-methyl styrene or poly-dichlorostyrene, and polysulfones.

Also suitable are copolymers, e.g., copolymers of PEN, PBN, PPN, PCN, PHN, PET, PBT, PPT, PCT, PHT (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol.

In addition, the birefringent layer may include blends of two or more of the above-described polymers or copolymers.

In some embodiments, the birefringent layer preferably comprises polyalkylene naphthalates, polyalkylene terephthalates, and blends thereof. Another preferred birefringent layer is syndiotactic polystyrene.

The transmission of the multilayer film in the pass state (or p-polarized light, i.e. in-plane direction that allows relatively more light to go through) can be controlled using different stretching profile and different PMMA/SAN blend compositions. The following table depicts exemplary multilayer optical films that illustrate that by controlling the stretching profile and SAN/PMMA compositions, the pass state transmission can be continuously tuned from about 10% to 73%. Higher transmission can be obtained when the PMMA/SAN blend comprises a higher concentration of SAN.

Properties of Film

| Stretch Ratios | 3.25 × 5.0 | 3.3 × 6.0 | 1.0 × 6.0 | 1.0 × 6.0 |
|---|---|---|---|---|
| Nx, PEN | 1.80 | 1.80 | 1.82 | 1.82 |
| Ny, PEN | 1.69 | 1.67 | 1.62 | 1.62 |
| Nz, PEN | 1.50 | 1.50 | 1.50 | 1.50 |
| PMMA/SAN Blend Composition | 95/5 | 30/70 | 30/70 | 4/96 |
| PMMA/SAN Blend RI | 1.49 | 1.54 | 1.54 | 1.56 |
| Primary Band width | 410-930 | 410-900 | 410-900 | 410-970 |
| Pass State Transmission % | 10% | 35% | 63% | 73% |
| Block State Transmission % | 1% | 4% | 2% | 2% |

The intrinsic viscosity of the polymeric material of the first and second optical layers as well as optional coextrudeable additional (e.g. skin) layers is related to the molecular weight (in the absence of branching monomers) of the polymer. Typically, the polyesters have an intrinsic viscosity of greater than about 0.4 dL/g. Preferably, the intrinsic viscosity is between about 0.4 to 0.9 dL/g. Intrinsic viscosity, for purposes of this disclosure, is measured in a 60/40 wt. % phenol/o-dichlorobenzene solvent at 30° C. unless otherwise indicated.

Furthermore, the first and second optical layers, as well as coextrudeable additional layers are chosen to have similar rheological properties (e.g., melt viscosities). Typically, the second optical layers and coextrudeable additional layers have a glass transition temperature, Tg, that is either below or no greater than about 40° C. above the glass transition temperature of the first optical layers. Preferably, the glass transition temperature of the second optical layers and the optional additional layers is below the glass transition temperature of the first optical layers.

In some embodiments, only the second isotropic layer comprises the blends of PMMA and SAN, as described herein. In other embodiments, only the skin layer(s) comprise such blends of PMMA and SAN. In yet other embodiments, both the second isotropic layers and the skin(layer(s) are formed from a low haze blend of PMMA and SAN.

Referring again to FIG. 1, the multilayer film may optionally comprise one or more of the skin layers 18 laminated to or formed as a skin layer over at least one surface of stack 16 as illustrated in FIG. 1. Layers of the same or differing materials may also be distributed within the stack.

In some embodiments, the additional layers 18 typically do not significantly participate in the determination of the multilayer birefringent optical properties of the multilayer polymer film 10, at least across the wavelength region of interest. The additional layers 18 are typically not birefringent or orientable. Such additional layers may protect the optical layers from damage, aid in the co-extrusion processing, and/ or to enhance post-processing mechanical properties and/or provide greater mechanical strength to the stack.

Alternatively, the appearance and/or performance of multilayer film may be altered by including additional layers such as a skin layer on a major surface or an underskin layer contiguous with a skin layer within the stack of film layers.

Typically, when the additional layers 18 are used as skin layers there will be at least some surface reflection. If the multilayer polymer film 10 is to be a polarizer, the additional layers preferably have an index of refraction which is relatively low. This decreases the amount of surface reflection. If the multilayer polymer film 10 is to be a mirror, the additional layers 18 preferably have an index of refraction which is high, to increase the reflection of light.

When the additional layers 18 are found within the stack 16, there will typically be at least some polarization or reflection of light by the additional layers 18 in combination with the optical layers 12, 14 adjacent to the additional layers 18. Typically, however, the additional layers 18 have a thickness which dictates that light reflected by the additional layers 18 within the stack 16 has a wavelength outside the region of interest, for example, in the infrared region for visible light polarizers or mirrors.

The additional layers may be prepared from polyesters such as coPEN. The additional layers may also be prepared from any of the polymeric materials previously described for use as the second low refractive index layer.

Skin layers and interior layers may be integrated at the time of film formation, either by coextrusion or in a separate coating or extrusion step, or they may be applied to the finished film at a later time, such as by coating or lamination of a skin layer to a previously formed film. Total additional layer thicknesses typically range from about 2% to about 50% of the total thickness of multilayer film.

Examples of additional layers or coatings are described in U.S. Pat. Nos. 6,368,699, and 6,459,514 both entitled "Multilayer Polymer Film with Additional Coatings or Layers,", and U.S. Pat. No. 6,783,349 to Neavin et al., entitled "Apparatus for Making Multilayer Optical Films".

The composition of additional layers may be chosen, for example, to protect the integrity of layers 12, 14 during or after processing, to add mechanical or physical properties to multilayer film 10; or to add optical functionality to multilayer film 10. Functional components such as antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners may be included in these layers, preferably such that they do not substantially interfere with the desired optical or other properties of the resulting product. In some exemplary embodiments, one or more additional layers may be or may include diffusers, such as a rough, matte or structured surface, a beaded diffuser or a diffuser including organic and/or inorganic particles, or any number or combination thereof.

In one example, skin layers are used to aid in post-extrusion processing; for example, by preventing sticking of the film to hot rollers or tenter clips. In another embodiment, skin layers are added to impart desired barrier properties to multilayer film. For example, barrier films or coatings may be added as skin layers or as a component in skin layers to alter the transmissive properties of the multilayer film towards liquids, such as water or organic solvents, or gases, such as oxygen or carbon dioxide.

Skin layers may also be added to impart or improve abrasion resistance in the resulting multilayer film. For example, a skin layer comprising inorganic particles such as silica embedded in a polymer matrix may be used. In another embodiment, skin layers may comprise an abrasion resistant coating such as described in U.S. Pat. No. 5,677,050. Skin layers may also be added to impart or improve puncture and/or tear resistance in the resulting multilayer film. Puncture or tear resistant skin layers may be applied during the manufacturing process or later coated onto or laminated to multilayer film 10. Adhering these layers to multilayer film 10 during the manufacturing process, such as by a coextrusion process, provides the advantage that multilayer film 10 is protected during the manufacturing process.

In one example, additional layer(s) includes a dye or pigment that absorbs in one or more selected regions of the spectrum. Exemplary selected regions of the spectrum may include portions or all of the visible spectrum as well as ultraviolet and infrared. If all of the visible spectrum is absorbed, the layer will appear opaque. Materials for layers can be selected in order to change the apparent color of light transmitted or reflected by multilayer film. They can also be used to compliment the properties of the film, particularly where the film transmits some frequencies while reflecting others. In another embodiment, the use of a UV absorptive material in a skin cover layer is particularly desirable because it may be used to protect inner layers that may sometimes be unstable when exposed to UV radiation. In one embodiment, a fluorescent material is incorporated into the additional layer. Fluorescent materials absorb electromagnetic energy in the ultraviolet region of the spectrum and reemit in the visible.

Adhesives, including pressure sensitive adhesives, form another desirable class of materials that may be applied to a multilayer stack as a skin layer. Generally, pressure sensitive adhesives are applied when multilayer film is intended for later lamination to another material, such as a glass or metal substrate.

Another material that may be incorporated in skin layer is a slip agent. A slip agent will make multilayer film easier to handle during the manufacturing process. Typically a slip agent is used with a mirror film rather than a film intended to transmit a portion of the light striking it. The side including the slip agent is typically the side intended to be laminated to a supporting substrate in order to prevent the slip agent from increasing haze associated with the reflection.

Many of the advantages derived from skin layers can also be derived from an analogous internal layer. Thus, the foregoing discussion regarding skin layers is also applicable to internal layer(s).

Other additional layers include layers containing holographic images, holographic diffusers, or other diffusing layers. The foregoing has described examples of various layers that can be applied to a multilayer film stack to alter its properties. In general, any additional layers may be added, typically offering different mechanical, chemical, or optical properties than those of the layers 12, 14.

In the exemplary embodiment, the additional layer may be an absorbing or dichroic polarizer layer, as described, for example, in U.S. Pat. No. 6,096,375 to Ouderkirk et al., entitled "Optical Polarizer". In some such configurations, the transmission axis of a dichroic polarizer is aligned with the transmission axis of a reflective polarizer.

A description of the process conditions and considerations for forming multilayer polymer films is found in U.S. patent application Ser. No. 09/006,288 entitled "Process for Making Multilayer Optical Film."

The films are generally prepared by co-extruding the individual polymers to form multilayer film and then orienting film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirror films, the film is stretched substantially in two directions (biaxial orientation), which may be performed simultaneously or sequentially.

In different processing embodiments, the multilayer film may be allowed to dimensionally relax in a cross-stretch direction, resulting in a natural reduction in cross-stretch (equal to the square root of the stretch ratio); the multilayer film may be constrained to limit any substantial change in cross-stretch dimension; or the multilayer film may be actively stretched in a cross-stretch dimension. For example, the multilayer film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship and physical dimensions. These variables are interdependent; thus, for example, a relatively low stretch rate could be used if coupled with, for example, a relatively low stretch temperature. In general, a stretch ratio in the range from about 1:2 to about 1:10 (more preferably about 1:3 to about 1:7) in the stretch direction and from about 1:0.2 to about 1:10 (more preferably from about 1:0.5 to about 1:7) orthogonal to the stretch direction is selected in an exemplary embodiment.

Suitable multilayer films may also be prepared using techniques such as spin coating (e.g., as described in Boese et al., J. Polym. Sci.: Part B, 30:1321 (1992) for birefringent polyimides) and vacuum deposition (e.g., as described by Zang et. al., Appl. Phys. Letters, 59:823 (1991) for crystalline organic compounds); the latter technique is particularly useful for certain combinations of crystalline organic compounds and inorganic materials.

Test Methods

Refractive Index (RI) Measurement:

The refractive indices of the various samples were measured using a Metricon Prism coupler (Metricon Corporation, Pennington, N.J.) in the MD, TD, and TM directions. MD and TD are in-plane directions and TM is normal to the film surface. The refractive indices of MD, TD and TM are labeled as: $n_x$, $n_y$, and $n_z$, respectively. The reported refractive index is the average of $n_x$, $n_y$, and $n_z$.

Haze

The haze was measured according to ASTM D1003-00 using a BYK Haze-Gard Plus. Since the films had a smooth surface, the reported haze value is indicated of the bulk haze.

Polymers Employed in the Examples 1. poly(methyl methacrylate) (PMMA) obtained from Arkema, Philadelphia, PA under the trade designation "PlexiglasVO44".
2. styrene acrylonitrile copolymer (10% AN) obtained from Monomer-Polymer Company.
3. styrene acrylonitrile copolymer (17% AN) commercially available from Lanxell Corporation, Pittsburgh, PA under the trade designation "Lustran Sparkle"
4. styrene acrylonitrile copolymer (20% AN) commercially available from Dow Chemicals under the trade designation "Tyril 990"
5. styrene acrylonitrile copolymer (23.8% AN) commercially available from Samsung, Korea under the trade designation "HF5661HC"
6. styrene acrylonitrile copolymer (28.1% AN) commercially available from Samsung, Korea under the trade designation "HF5670HC"
7. polystyrene homopolymer commercially available from Dow Chemicals under the trade designation "Styron 486"

A birefringent copolyester polymer ("90/10 coPEN") in which 90 mol % of the diacid moieties are derived from naphthalene dicarboxylic acid, 10 mol % of the diacid moieties are derived from terephthalic acid or its esters, and the diol moieties are derived from ethylene glycol was prepared as described in U.S. Ser. No. 12/114,109, filed May 2, 2008.

Isotropic coPEN 1 is a copolyester in which 55 mol % of the diacid moieties result from use of naphthalene dicarboxylic acid or its esters and 45 mol % of the diacid moieties result from use of terephthalic acid or its esters, and the diol moieties result from use of a mixture of diols which includes 1,6-hexanediol, in the polymerization reaction. Isotropic coPEN 1 was made as follows: A batch reactor was charged with 88.5 kg dimethyl 2,6-naphthalenedicarboxylate, 57.5 kg dimethyl terephthalate, 81 kg ethylene glycol, 4.7 kg 1,6-hexanediol, 239 g trimethylol propane, 22 g zinc(II) acetate, 15 g cobalt(II) acetate, and 51 g antimony(III) acetate. Under pressure of 20 psig, this mixture was heated to 254° C. with removal of the esterification reaction by-product, methanol. After 39.6 kg of methanol was removed, 37 g of triethyl phosphonoacetate was charged to the reactor and the pressure was then gradually reduced to 1 torr (131 N/m2) while heating to 290° C. The condensation reaction by-product, ethylene glycol, was continuously removed until a polymer with an intrinsic viscosity of 0.56 dL/g, as measured in 60/40 wt-% phenol/o-dichlorobenzene at 23° C., was produced. The copolyester polymer produced by this method had a glass transition temperature (Tg) of 94° C. as measured by differential scanning calorimetry at a temperature ramp rate of 20° C. per minute.

EXAMPLES 1-6 & COMPARATIVES 1-3

Monolayer films were made from blend of PMMA and SAN comprising different level of acrylonitrile by a twin screw extruder with a 6" monolayer die. Extruder temperature profile was from 420° F.-500° F., and 500° F. on the monolayer die. The optical properties of the resulting film were measured and reported in Table 1.

TABLE 1

Optical Properties Films Comprising PMMMA, SAN and Blends Thereof

| | Compositions | Thickness (mil) | Haze (%) |
|---|---|---|---|
| Control 1 | 100% PMMA | 5.6 | 2.2 |
| Control 2 | 100% Lustran Sparkle SAN(17% AN) | 5 | 3.5 |
| Comparative 1 | 50% SAN(10% AN) + 50% PMMA | 1.9 | 89.1 |
| Example 1 | 25% Lustran Sparkle(17% AN) + 75% PMMA | 5 | 0.6 |
| Example 2 | 50% Lustran Sparkle (17% AN) + 50% PMMA | 5 | 0.6 |
| Example 3 | 25% Tyril 990(20% AN) + 75% PMMA | 6 | 1.2 |

TABLE 1-continued

Optical Properties Films Comprising PMMMA, SAN and Blends Thereof

| | Compositions | Thickness (mil) | Haze (%) |
|---|---|---|---|
| Example 4 | 50% Tyril 990(20% AN) + 50% PMMA | 6.3 | 1.2 |
| Example 5 | 25% Starex HF5661HC(23.8% AN) + 75% PMMA | 6.1 | 4 |
| Example 6 | 50% Starex HF5661HC(23.8% AN) + 50% PMMA | 6.1 | 2.2 |
| Comparative 2 | 25% Starex HF5670(28.1% AN) + 75% PMMA | 5.8 | 62.9 |
| Comparative 3 | 50% HF5670(28.1% AN) + 50% PMMA | 5.9 | 73 |

As shown in Table 1, the blends made from SAN with acrylonitrile at 10 wt-% and 28.1 wt-% exhibited high haze and low transmission; whereas blends comprising greater than 10 wt-% and less than 28 wt-% acrylonitrile exhibited low haze and high transmission.

EXAMPLE 7

Monolayer films were made from blend of PMMA with Lustran Sparkle (17 wt % AN) by a twin screw extruder with a 6" monolayer die. Extruder temperature profile was from 420° F.-500° F., and 500° F. on the monolayer die. The average refractive index of the resulting films were measured and plotted in FIG. 2.

The results show that the refractive index of the PMMA can be adjusted higher by adding the desired amount of SAN.

EXAMPLE 8

Multilayer films were made from 90/10 coPEN and a blend of 75 wt % PMMA and 25 wt % Lustran Sparkle. The resulting 61 layer film was measured to have a haze of approximately 4.04% and transmission of approximately 83.4%. The multilayer film was delaminated carefully by hand and then measured to have a refractive index of 1.51 at 633 nm from the PMMA-SAN blend layer.

EXAMPLE 9

Multilayer films were made from 90/10 coPEN and a blend of 50 wt % PMMA and 50 wt % Lustran Sparkle. The resulting 61 layer film was measured to have a haze of approximately 2.64% and transmission of approximately 84.7%. The multilayer film was delaminated carefully by hand and then measured to have a refractive index of 1.53 at 633 nm from the PMMA-SAN blend layer.

COMPARATIVE 4

Monolayer films were made from blend of 50 wt % PMMA and 50 wt % Styron 486 by a twin screw extruder with a 6" monolayer die. Extruder temperature profile was from 420° F.-500° F., and 500° F. on the monolayer die. The resulting Emil film was measured to have a haze of approximately 100% and transmission approximately 20%. The high haze results reveal again that Styron 486 is not miscible with PMMA by melt processing.

EXAMPLE 10

A coextruded film containing 275 layers was made on a sequential flat-film-making line via a coextrusion process. 90/10 coPEN was delivered by one extruder at a rate of 100 pounds per hour, and blend of PMMA and Tyril 990 with a ratio of 87.5:12.5 was mixed and delivered by another twin screw extruder at a rate of 80 pounds per hour. There is a skin layer of Isotropic coPEN 1 fed by a third extruder at a rate of 125 pounds per hour. A feedblock method was used to generate 275 layer casting film. The film was subsequently preheated to about 280° F., drawn in the transverse direction to a draw ratio of about 5.6, and then relaxed about 3% of its maximum width in a heat-set oven at 360-400° F. was 1.50 and the resulting final stretched film had an average transmission for p-polarized light of 34% from 400 nm -800 nm parallel to the stretching direction and a transmission of 0% at 90 degrees (i.e. orthogonal) to the stretching direction from 400 nm-800 nm.

EXAMPLE 11

A coextruded film containing 275 layers was made on a sequential flat-film-making line via a coextrusion process. 90/10 coPEN was delivered by one extruder at a rate of 100 pounds per hour, and blend of PMMA and Tyril 990 with a ratio of 52.5:47.5 was mixed and delivered by another twin screw extruder at a rate of 80 pounds per hour. There is a skin layer of Isotropic coPEN 1 fed by a third extruder at a rate of 125 pounds per hour. A feedblock method was used to generate 275 layer casting film. The film was subsequently preheated to about 280° F., drawn in the transverse direction to a draw ratio of about 5.6, and then relaxed about 3% of its maximum width in a heat-set oven at 360-400° F. The refractive index of the blend of PMMA and Tyril 990 with a ratio of 52.5:47.5 is about 1.52, and the resulting final stretched film has an average transmission for p-polarized light of 45% from 400 nm-800 nm parallel to the stretching direction and a transmission of 0% at 90 degrees (i.e. orthogonal) to the stretching direction from 400 nm-800 nm.

What is claimed is:
1. A multilayer optical film comprising
an optical stack comprising
at least one first birefringent optical layer; and
at least one second layer having a birefringence of less than 0.04 at 633 nm, optionally at least one skin layer;
wherein the second layer or the skin layer when present, or a combination thereof comprises a blend of at least one methyl methacrylate polymer comprising at least 90 percent by weight methyl methacrylate and at least one styrene-acrylonitrile polymer and the multilayer film has a haze of no greater than 5%.
2. The multilayer optical film of claim 1 wherein the styrene-acrylonitrile polymer has an acrylonitrile concentration of greater than 10 wt-% and less than 28 wt-%.
3. The multilayer optical film of claim 1 wherein the multilayer film comprises about 1 wt-% to about 14 wt-% acrylonitrile.
4. The multilayer optical film of claim 1 wherein the blend comprises at least 10 wt-% of the styrene-acrylonitrile polymer.
5. The multilayer optical film of claim 1 wherein the second layer or the skin layer when present, or a combination thereof comprises at least 10 wt-% of the methyl methacrylate polymer.
6. The multilayer optical film of claim 1 wherein the second layer comprises the blend of at least one methyl methacrylate polymer and at least one styrene-acrylonitrile polymer.

7. The multilayer optical film of claim 6 wherein the blend has an average refractive index ranging from 1.50 to 1.55.

8. The multilayer optical film of claim 1 wherein the optical stack comprises at least 10 of the first birefringent layers alternated with the second layers.

9. The multilayer optical film of claim 8 wherein the multilayer optical film is a mirror film.

10. The multilayer optical film of claim 8 wherein the multilayer optical film is a polarizing film.

11. The multilayer optical film of claim 10 wherein the polarizing film exhibits an average transmission for pass state light ranging from 10% to 80%.

12. The multilayer optical film of claim 1 wherein the film is an asymmetric reflective film.

13. The multilayer optical film of claim 1 wherein the film exhibits an average on-axis reflectivity of at least 90% for visible light polarized in a first plane, and an average on-axis reflectivity of at least 25% but less than 90% for visible light polarized in a second plane perpendicular to the first plane.

14. The multilayer optical film of claim 1 wherein the birefringent layer comprises polyalkylene naphthalates, polyalkylene terephthalates, and blends thereof.

15. The multilayer optical film of claim 1 wherein the birefringent layer comprises syndiotactic polystyrene.

16. A multilayer optical film comprising
an optical stack comprising
at least one first birefringent optical layer; and
at least one second optical layer having a birefringence of less than 0.04 at 633 nm; and
optionally at least one skin layer;
wherein the second layer or the skin layer when present, or a combination thereof comprise a blend of at least one methyl methacrylate polymer comprising at least 90 percent by weight methyl methacrylate and at least one styrene-acrylonitrile polymer and the styrene-acrylonitrile polymer has an acrylonitrile concentration of greater than 10 wt-% and less than 28 wt-%.

17. A multilayer optical film comprising
an optical stack comprising
at least one first birefringent optical layer; and
at least one second optical layer having a birefringence of less than 0.04 at 633 nm; and
optionally at least one skin layer;
wherein the second layer or the skin layer when present, or a combination thereof comprise a blend of at least one methyl methacrylate polymer comprising at least 90 percent by weight methyl methacrylate and at least one styrene-acrylonitrile polymer and the optical stack comprises about 0.5 wt-% to about 12.5 wt-% acrylonitrile.

* * * * *

UNITED STATES PATENT AND TRADEMARK OFFICE
CERTIFICATE OF CORRECTION

PATENT NO.       : 8,467,131 B2
APPLICATION NO.  : 13/003312
DATED            : June 18, 2013
INVENTOR(S)      : Ta-Hua Yu It is certified that error appears in the above-identified patent and that said Letters Patent is hereby corrected as shown below:

In the Specifications

Column 1
Line 23, Delete "indicies" and insert -- indices --, therefor.

Column 4
Line 62, Delete "birefrigence" and insert -- birefringence --, therefor.

Column 5
Line 56, Delete "Mitsuibishi" and insert -- Mitsubishi --, therefor.
Line 58, Delete "Acylics" and insert -- Acrylics --, therefor.

Column 6
Line 23, Delete "indicies," and insert -- indices, --, therefor.

Column 7
Line 58, Delete "dimethanel" and insert -- dimethane --, therefor.
Line 62, Delete "bibenzoic" and insert -- dibenzoic --, therefor.

Column 11
Line 66, Delete "Lanxell" and insert -- Lanxess --, therefor.

Column 12
Line 55, Delete "PMMMA," and insert -- PMMA, --, therefor.

Column 13
Line 3, Delete "PMMMA," and insert -- PMMA, --, therefor.
Line 59, Delete "Emil" and insert -- 61 layer --, therefor.

Signed and Sealed this
First Day of October, 2013

Teresa Stanek Rea
*Deputy Director of the United States Patent and Trademark Office*